United States Patent [19]
Lehtinen et al.

[11] Patent Number: 6,030,562
[45] Date of Patent: Feb. 29, 2000

[54] METHOD OF MAKING CELLULOSIC COMPOSITE ARTICLES

[75] Inventors: Thomas A. Lehtinen, Cary, N.C.; Thomas M. Ruffin, Laurel, Miss.; John Peter Walsh, St. Charles, Ill.; Allen R. Hill, Laurel, Miss.

[73] Assignee: Masonite Corporation, Chicago, Ill.

[21] Appl. No.: 08/985,094

[22] Filed: Dec. 4, 1997

Related U.S. Application Data

[63] Continuation-in-part of application No. 08/519,304, Aug. 25, 1995, abandoned.

[51] Int. Cl.[7] .................................................. B27N 3/08
[52] U.S. Cl. .......................... 264/83; 264/109; 264/119; 264/122; 524/13; 524/405
[58] Field of Search ............................ 264/83, 109, 122, 264/119; 524/13, 404, 405

[56] References Cited

U.S. PATENT DOCUMENTS

| | | | |
|---|---|---|---|
| 2,194,690 | 3/1940 | Clayton et al. | 134/44 |
| 3,164,511 | 1/1965 | Elmendorf | 161/57 |
| 3,438,847 | 4/1969 | Chase | 161/166 |
| 3,718,615 | 2/1973 | Woods et al. | 524/405 |
| 3,770,577 | 11/1973 | Humphrey | 162/159 |
| 3,816,305 | 6/1974 | Woods | 524/405 |
| 4,014,839 | 3/1977 | Kraft et al. | 260/29.6 |
| 4,065,413 | 12/1977 | MacInnis et al. | 260/9 |
| 4,076,871 | 2/1978 | Short et al. | 427/397 |
| 4,104,374 | 8/1978 | Reuther et al. | 424/185 |
| 4,130,458 | 12/1978 | Moore et al. | 162/159 |
| 4,145,242 | 3/1979 | Chow | 156/316 |
| 4,184,969 | 1/1980 | Bhat | 252/8.1 |
| 4,209,561 | 6/1980 | Sawko | 428/114 |
| 4,228,202 | 10/1980 | Tjännberg | 427/212 |
| 4,237,087 | 12/1980 | Jones | 264/119 |
| 4,241,133 | 12/1980 | Lund et al. | 428/326 |
| 4,393,019 | 7/1983 | Geimer | 264/83 |
| 4,438,028 | 3/1984 | Schmittmann et al. | 252/609 |
| 4,457,978 | 7/1984 | Wawzonek | 524/14 |
| 4,517,147 | 5/1985 | Taylor et al. | 264/83 |
| 4,610,900 | 9/1986 | Nishibori | 428/15 |
| 4,643,860 | 2/1987 | Knudson et al. | 264/109 |
| 4,850,849 | 7/1989 | Hsu | 425/407 |
| 4,879,083 | 11/1989 | Knudson et al. | 264/122 |
| 4,883,546 | 11/1989 | Kunnemeyer | 264/119 |
| 4,935,281 | 6/1990 | Tolbert et al. | 428/116 |
| 4,937,024 | 6/1990 | Hickson et al. | 264/83 |
| 5,098,472 | 3/1992 | Watkins et al. | 106/15.05 |
| 5,134,023 | 7/1992 | Hsu | 428/288 |
| 5,194,323 | 3/1993 | Savoy | 428/305.5 |
| 5,195,428 | 3/1993 | Gawlitta et al. | 100/73 |
| 5,207,823 | 5/1993 | Shiozawa | 106/18.13 |
| 5,246,652 | 9/1993 | Hsu et al. | 264/109 |
| 5,270,108 | 12/1993 | Savoy | 428/305.5 |
| 5,300,192 | 4/1994 | Hansen et al. | 162/184 |
| 5,373,674 | 12/1994 | Winter, IV | 52/309.9 |
| 5,629,083 | 5/1997 | Teodorczyk | 428/308.8 |
| 5,763,338 | 6/1998 | Sean | 442/413 |

FOREIGN PATENT DOCUMENTS

| | | |
|---|---|---|
| 56-62857 | 5/1981 | Japan . |
| 1435519 | 5/1976 | United Kingdom . |

OTHER PUBLICATIONS

International Search Report dated Mar. 30, 1999, in PCT/US98/25778.

E. L. Schmidt et al., "Evaluation of Preservation Effects on Mechanical Properties and Biodurability of Aspen Waferboard," pp. 153–160 (Oct. 1982).

Ross et al., "Treatment of Alternative Wood Species for the Millwork Industry," American Wood–Preservers' Association 90th Annual Meeting, May 14–18, 1994, pp. 127–150.

"Flameproofing of Board With Boron Compounds," Technical Service Bulletin, Borax Consolidated Limited (Revised Jan. 1993).

Suchsland et al., "Fiberboard Manufacturing Practices in the United States," *U.S. Forest Service Agricultural Handbook*, No. 640, pp. 136–167 (1986).

John A. Youngquist, Laminated Wood–Based Composites, Kirk–Othmer Encyclopedia of Chemical Technology (3d ed., 1981).

*Primary Examiner*—Mary Lynn Theisen
*Attorney, Agent, or Firm*—Marshall, O'Toole, Gerstein, Murray & Borun

[57] ABSTRACT

A method of forming a consolidated wood product is disclosed wherein zinc borate and resin are mixed with cellulosic material to form treated cellulosic material, followed by applying heat and pressure to form a consolidated cellulosic product. A consolidated product comprises zinc borate, resin, and cellulosic material, wherein the zinc borate is distributed throughout the lignocellulosic material. A steam injection process is also disclosed.

24 Claims, No Drawings

METHOD OF MAKING CELLULOSIC COMPOSITE ARTICLES

CROSS REFERENCE TO RELATED APPLICATIONS

This is a continuation-in-part of U.S. application Ser. No. 08/519,304 filed Aug. 25, 1995, now abandoned.

BACKGROUND OF THE INVENTION

1. Field of the Invention

The invention relates generally to a method of producing a consolidated cellulosic product and more specifically to a method of producing a consolidated cellulosic product resistant to fungi.

2. Description of Related Technology

Exterior grade wood products such as millwork used for doors and windows must be treated for rot resistance to prevent deterioration from wood-destroying fungi. These wood products are usually dip-treated, vacuum-treated, or coated with a fungicide. Borates such as sodium borate are known to be effective fungicide materials for solid wood products. These treatment methods have the disadvantage of producing a "shell effect," wherein the products have rot resistance only to a very small depth from the surface of the wood product. As a result, if the wood product is cut or develops cracks or checks after the fungicide is applied, then it must be re-treated with a fungicide.

Consolidated cellulosic, e.g., wood, products include particle boards, made from wood particles, and fiberboards, made from wood fibers. Consolidated wood products are generally formed by mixing a synthetic resin adhesive or other suitable binder with wood fibers or wood particles, and then bonding together the fibers or particles in the presence of heat and pressure. When consolidated wood products, such as medium density fiberboard used to make windows or doors, are used for exterior applications, a separate step of applying fungicide is required to protect the wood product after the consolidated wood product is formed.

In the past zinc borate has been used to treat softwood wafers (a type of wood particle) that are consolidated to form waferboard (a type of particle board). Treating wood particles or fibers before a consolidated wood product is formed has the advantage of producing a product that has consistent fungus resistance throughout its cross section. Therefore, if the consolidated wood product is cut or develops cracks or checks, it maintains effective rot resistance. As known in the art, fungicides that are effective for softwood species may not be effective for hardwood species or for mixed hardwoods. Moreover, fungicides affect wood fibers differently from wood wafers or other types of wood particles. Zinc borate has never been used to treat hardwood particles or hardwood fibers to form fungus-resistant consolidated wood products.

SUMMARY OF THE INVENTION

It is an object of the invention to overcome one or more of the problems described above.

According to the invention, zinc borate and resin, and preferably a wax, are mixed with lignocellulosic material to form treated lignocellulosic material, and heat and pressure are applied to the treated lignocellulosic material to form a consolidated wood product. The invention also provides a consolidated wood product comprising zinc borate, resin, and lignocellulosic material, wherein the zinc borate is distributed throughout the lignocellulosic material.

In a further embodiment of the invention, zinc borate and a binder resin are combined with cellulosic material to form a mat. Steam is injected into the mat, as by a steam injection process, to transfer heat to the mat so as to cure the resin.

Other objects and advantages of the invention will be apparent to those skilled in the art from a review of the following detailed description, taken in conjunction with the appended claims.

DETAILED DESCRIPTION OF THE INVENTION

According to the invention, zinc borate and resin are mixed with lignocellulosic material to form treated lignocellulosic material, and heat and pressure are applied to the treated lignocellulosic material to form a consolidated wood product. Throughout this description, data are expressed in wt. %, based on dry weight of lignocellulosic material, unless otherwise indicated.

Consolidated wood products include particle boards, made from wood particles, and fiberboards, made from wood fibers. The term "lignocellulosic materials" includes both wood particles and wood fibers. "Wood particles" refers to particles of various sizes, such as wood shavings, sawdust, chips, flakes, wafers, or strands. Particles may be formed from either hardwoods, such as sweet gum, black gum, oak, yellow poplar, or hickory, or from softwoods, such as pine, fir, or redwood. Particles may be obtained as byproducts from wood mills or furniture plants and may be broken down to the desired size by using hammermills or knives, as in flakers. Fiberboards are made from wood fibers. Wood fibers are obtained by first breaking down logs into chips. The chips are then refined in thermo-mechanical refiners (similar to paper-making equipment) that break down the chips into relatively uniform fibers by using steam and mechanical action. Fibers are typically very narrow and approximately about 1 mm to about 3 mm in length.

Consolidated wood products are formed by adding a synthetic resin adhesive or other suitable binder to wood fibers or wood particles, and then bonding together the fibers or particles in the presence of heat and pressure.

Wood products, such as consolidated wood products, used for exterior applications, particularly those used for doors or window frames, require fungicide treatment to prevent deterioration from wood-destroying fungi. Soluble sodium borate has been used as a fungicide in some solid wood products. Wood products for doors and windows, for example, are generally dip-treated, vacuum-treated, or coated with a fungicide material. Soluble borate treatments for solid wood do not include zinc borate. According to the invention, zinc borate fungicide and resin are mixed with wood fibers or wood particles to form treated wood fibers or particles, and a consolidated wood product is formed by applying heat and pressure to the treated wood fibers or particles. Zinc borate is believed to be particularly effective because of its low solubility in water. Given zinc borate's low solubility, it is convenient to use in powdered form, rather than in solution or suspension. The resulting consolidated wood product is resistant to fungi, and thus does not require a separate dip, vacuum, or coating treatment of fungicide. Moreover, the product is resistant throughout its cross section, so that additional fungicide treatment is not required if the product is cut or develops cracks or checks.

According to the invention a consolidated wood product, such as a medium density fiberboard ("MDF"), for example, is formed. The consolidated wood product is preferably formed from dry (typically about 5 wt. % moisture) lignocellulosic material, such as hardwood fibers or particles. If hardwood fibers or particles are used they may be from a single hardwood species, or from a mixture of species such as sweet gum, black gum, oak, yellow poplar, and hickory. Zinc borate is mixed with the lignocellulosic material. Thorough mixing is important to assure that the product will have uniform fungus resistance. About 0.1% to about 3.0% zinc borate is preferred, about 0.5% to about 2.0% is more preferred, and about 0.5% is most preferred.

It is believed that higher amounts of zinc borate in the product may also provide effective termite resistance, in addition to fungus resistance. To provide termite resistance in the product, about 2% zinc borate or greater, based on the cellulosic material, is preferred.

A resin is added to the lignocellulosic material and zinc borate. The resin may be mixed with the lignocellulosic material and zinc borate in a single mixing step, or the resin may be added after the zinc borate and lignocellulosic material have been mixed. Melamine-urea-formaldehyde resin ("MUF") is preferred, but other resins known in the art, such as isocyanate resins, may be used. The MUF preferably comprises about 9% to about 15%, more preferably about 10% to about 14%, and most preferably about 12%. Wax, such as an emulsified slack wax, is also preferably added to the lignocellulosic material to improve water resistance of the product, preferably at a rate of about 1% to about 3%, and more preferably about 2%. The combination of zinc borate and wax can produce an excellent product for exterior applications.

Optionally, a catalyst such as ammonium sulfate may also be added to accelerate curing of the resin. Preferably, about 0.4% to about 0.8% (based on dry weight of resin), more preferably about 0.6%, ammonium sulfate is used.

Preferably, the lignocellulosic material, zinc borate, binder resin, wax, and optional catalyst are mixed in a blender, and a mat of treated lignocellulosic material is thus formed and placed on a heated platen. The mat is consolidated by applying heat and pressure, such as by upper and lower heated platens. Preferably, a radio-frequency ("RF") curing apparatus is used, which applies a radio frequency field to add heat to the mat. Optionally, a steam injection process may be used to add heat to the mat, as described below. Preferably, about 200 psig to about 600 psig pressure is applied to the mat for about 3 minutes to about 8 minutes. The preferred pressing time varies according to factors such as the thickness of the product and the speed at which the resin cures, so that thicker products and slower curing resins require longer pressing times. The preferred pressing time may be decreased by increasing the temperature or by adding additional catalyst, which tend to accelerate curing of the resin. The product preferably has a density of about 40 lb/ft$^3$ to about 46 lb/ft$^3$.

According to a preferred embodiment of the invention, the composite cellulosic articles described herein are made by a process that includes a steam injection pressing operation. The process using a steam injection operation begins in the same manner as the process using a conventional pressing operation. A suitable binder resin may be initially combined with a selected cellulosic material (preferably a hardwood fiber or particle), followed by addition of zinc borate. Resins known in the art, such as MUF resins, isocyanate resins, or suitable phenolic resins, can be used with the inventive method. A curing agent and/or wax may be blended with the cellulosic material for incorporation into the mat. Optionally, the cellulosic material may initially be treated with zinc borate; a binder resin is then combined with the treated cellulosic material to form a mat.

Preferably, a dry felted process is utilized, and produces a mat having a moisture content of about 15 weight percent or less, more preferably about 12 weight percent or less, and most preferably about 10 weight percent or less, e.g., about 8 weight percent, based on the weight of dry cellulosic material.

The mat is placed in a pressing apparatus having steam injection capability. Steam is injected into the mat to transfer heat and moisture into the mat so as to cure the resin. The steam is preferably saturated. The pressure in the press is preferably in a range of about 100 psig to about 600 psig, and more preferably in a range of about 100 psig to about 400 psig, and most preferably in a range of about 200 psig to about 300 psig. The temperature of the saturated steam is preferably in a range of about 150° C. to about 200° C., while the press platens are preferably at a temperature in a range of about 150° C. to about 210° C. Press times generally are relatively short, and are preferably in a range of about 15 seconds to about 5 minutes, and more preferably less than one minute, e.g., about 30 seconds. However, these parameters are variable depending upon the thickness of the mat, as well as the materials and pressing apparatus that are utilized.

In the steam injection process, steam should flow into, through, and then out of the mat during the injection period. The steam injection press preferably includes at least one platen having inlet ports for injecting the saturated steam into a one side (top or bottom) of the mat. Ports in one of the platens can be used to vent the steam from the mat. For example, the steam may enter and exit from the bottom platen. Optionally, one platen (e.g., a top platen) may be used for injecting the steam, and another platen (e.g., a bottom platen) can be used to vent the steam. In such an embodiment, the steam may enter the top side of the mat evenly over its entire surface, then flow from the top surface to the bottom surface, and finally exit through the bottom platen.

As will be apparent to those of ordinary skill in the art, desirable pressing temperatures and pressures may be modified according to various factors, including the following: the thickness of the board, the type of cellulosic material being pressed, the moisture content of the cellulosic material, the press time, and the type of resin that is utilized. The moisture content of the cellulosic material (known as "furnish moisture content") is one important factor which controls the core temperature of the mat which can be achieved under given press conditions.

Steam injection processes and apparatus are described in Walter, "Steam Pressing Experience from Operating Plants and Future Possibilities" (G. Siempelkamp Gmbh and Co.) and U.S. Pat. Nos. 5,195,428; 5,134,023; and 4,850,849, the disclosures of which are hereby incorporated herein by reference.

The above method can be used in the manufacture of cellulosic composite articles such as fiberboard (e.g., medium density fiberboard or hardboard), waferboard, oriented strandboard (OSB), plywood, and particleboard, including composites thereof (e.g, a multi-layer article having a first layer of OSB and an overlay of fiberboard).

Preferred product applications include exterior siding, exterior and decorative trim pieces, shutters, soffits, door pediments (decorative areas surrounding a door), columns, and roofing. For some applications, the press platens preferably provide the final product with an embossed surface resembling natural wood. As indicated above, the inventive method is particularly advantageous in producing articles for exterior applications.

Testing methods, described with reference to the detailed examples below, demonstrate that the resulting consolidated wood products have excellent bond strength and resistance to fungal decay.

EXAMPLES

The invention will be illustrated by reference to the following detailed examples, which are not to be construed to limit the scope of the invention. Throughout, data are expressed in weight percent, based on dry weight of wood fibers, unless otherwise indicated.

Example 1

Medium density fiberboard ("MDF") panels including zinc borate were made according to the invention. The panels were made from dry hardwood fibers, having approximately 5% moisture. The fibers were from mixed hardwood species, such as sweet gum, black gum, oak, yellow poplar, and hickory. In ten separate trials, zinc borate additions of 0.5%, 1.0%, 2.0%, and 3.0% were made, with two MDF boards made at each zinc borate level, along with two boards made with no zinc borate addition.

For each trial, the hardwood fiber was placed in a blending cylinder and mixed. Zinc borate (Borogard ZB, U.S. Borax Inc.) particles having a particle size smaller than 400 mesh were added, and the zinc borate and fiber were blended in a Koos Bay blender for 30 seconds. MUF resin emulsion (Resin No. M01MM, Borden) (12%), a slack wax emulsion (EW403H wax emulsion, Borden) (2%), and an aqueous ammonium sulfate catalyst solution (0.56%, based on dry weight of resin) were sprayed into the blender with the blender running, to form treated hardwood fibers. A one-pass drying step was used to remove excess moisture (present due to the resin and wax emulsions and catalyst solution) and bring the mat moisture content to 7 to 8%. The one-pass drying apparatus comprises a 15 ft. long tube with a temperature of 200° F., and a retention time of less than one second.

The treated hardwood fibers were placed on a press platen, forming a 14"×14" mat, having a density of 6 lb/ft³. The mat was heated by electrically heating upper and lower platens to 310° F., and applying a radio frequency field for 180 seconds (4.5 MHz frequency output, 0.5 kV to 2.0 kV, and 1.5 amp input on Thermex RF curing apparatus). A hydraulic pressure of 3000 psig was applied to the platens until stops at a thickness of 0.750" were reached, after which the pressure was reduced to 1600 psig. These hydraulic pressures correspond to actual pressures of about 600 psig and about 200 psig, respectively, at the platen surface. The pressure at the platens was relieved after about 3½ minutes to about 4 minutes pressing time.

Pressing conditions for each of the ten boards are summarized below, wherein the comparative boards are designated C-1 and C-2, and the inventive ("ZB") boards are designated by reference to weight percentage zinc borate followed by 1 or 2, which represent the sample number:

TABLE 1

MDF Pressing Conditions

| Board No. | % Zinc Borate | Mat Moisture Content (%) | Delay Before RF On | Pressing Time |
|---|---|---|---|---|
| C-1 | 0 | 8.1 | — | — |
| C-2 | 0 | 8.1 | 30 sec. | 3 min. 49 sec. |
| ZB 0.5-1 | 0.5 | 7.3 | 25 sec. | 3 min. 33 sec. |
| ZB 0.5-2 | 0.5 | 7.3 | 21 sec. | 3 min. 31 sec. |

TABLE 1-continued

MDF Pressing Conditions

| Board No. | % Zinc Borate | Mat Moisture Content (%) | Delay Before RF On | Pressing Time |
|---|---|---|---|---|
| ZB 1-1 | 1.0 | 7.3 | 39 sec. | 3 min. 45 sec. |
| ZB 1-2 | 1.0 | 7.3 | 23 sec. | 3 min. 33 sec. |
| ZB 2-1 | 2.0 | 7.8 | 28 sec. | 3 min. 35 sec. |
| ZB 2-2 | 2.0 | 7.8 | 26 sec. | 3 min. 34 sec. |
| ZB 3-1 | 3.0 | 7.5 | 24 sec. | 3 min. 34 sec. |
| ZB 3-2 | 3.0 | 7.5 | 23 sec. | 3 min. 33 sec. |

PHYSICAL TESTING

Each of the boards was tested for physical properties. A density test was performed to measure how close the density of each board was to the target of 43 lb/ft³. A boil swell test procedure was performed to determine the percentage increase in thickness of boards after placing the boards in boiling water for 60 minutes. A low boil swell value indicates that the binder effectively held the board together. The bonding strength of each board was tested according to ASTM D-1037. The test results, which indicated effective bonding in each of the boards, are summarized below.

TABLE 2

MDF Physical Testing Results

| % Zinc Borate | Density Test Average Board Density (lb/ft³) | Boil Swell Test Average Caliper Swell % | Bonding Strength Test ASTM D-1037 | |
|---|---|---|---|---|
| | | | Average Bond (psi) | Average Density (lb/ft³) |
| 0 | 40.7 | 23.7 | 181 | 44.6 |
| 0.5 | 42.3 | 22.6 | 196 | 45.0 |
| 1.0 | 42.6 | 23.7 | 214 | 46.2 |
| 2.0 | 43.0 | 23.2 | 227 | 46.0 |
| 3.0 | 42.4 | 22.8 | 197 | 45.7 |

FUNGUS RESISTANCE TESTING

Each of the boards was tested for fungus resistance, according to the National Wood Window and Door Association test method NWWDA TM-1 Soil Block Test, Test Method to Determine Preservative Effectiveness in Preventing Wood Decay. The test involves exposing small wood board samples to two different fungus species. Weight loss of the blocks after exposure was evaluated and compared to samples of pine blocks with no preservative. The test results indicated that the zinc borate was effective at preventing decay by both fungus species tested for, *G. trabeum* (brown rot fungus) and *T. versicolor* (white rot fungus).

The results, which are summarized below in Tables 3 and 4, show a much lower loss of weight for each of the MDF samples having zinc borate, at each level of zinc borate, compared to the pine control blocks. A small weight loss for each of the blocks is attributed to minor leaching of some component of the blocks, but not due to fungal decay. Surprisingly, the MDF samples with 0% zinc borate also showed no fungal decay during the test for *G. trabeum,* although the control MDF blocks were significantly decayed by *T. versicolor.* The lack of decay due to *G. trabeum* is apparently due to effective moisture resistance of the blocks, and because *G. trabeum* is generally more destructive to softwoods, such as the pine control, than to hardwoods, such as those included in the MDF boards. The high weight loss for the MDP sample with 0% zinc borate, when exposed to *T. versicolor*, which is more than twice as much as the weight loss for the pine control blocks, is because *T. versicolor* is generally much more destructive to hardwoods than to softwoods.

TABLE 3

Soil Block Test Results - NWWDA TM-1
Brown Rot Fungus: *G. trabeum*

|           |          | Leached Boards | | Unleached Boards | |
|-----------|----------|----------------|----------|------------------|----------|
| Board No. | % Zinc Borate | Average % weight loss | Standard Deviation | Average % weight loss | Standard Deviation |
| C-1       | 0        | 4.9  | 0.8  | 5.2  | 1.1  |
| ZB 0.5-1  | 0.5      | 5.3  | 0.7  | 4.5  | 0.9  |
| ZB 1-1    | 1.0      | 3.9  | 1.2  | 3.8  | 1.2  |
| ZB 2-1    | 2.0      | 3.0  | 0.9  | 4.7  | 1.0  |
| ZB 3-1    | 3.0      | 3.0  | 1.6  | 4.2  | 0.7  |
| Pine Control | 0     | 48.9 | 18.3 | 44.5 | 15.0 |

TABLE 4

Soil Block Test Results - NWWDA TM-1
White Rot Fungus: *T. versicolor*

|           |          | Leached Boards | | Unleached Boards | |
|-----------|----------|----------------|----------|------------------|----------|
| Board No. | % Zinc Borate | Average % weight loss | Standard Deviation | Average % weight loss | Standard Deviation |
| C-1       | 0        | 62.5 | 2.1  | 56.9 | 2.2  |
| ZB 0.5-1  | 0.5      | 7.1  | 0.8  | 7.3  | 1.0  |
| ZB 1-1    | 1.0      | 7.6  | 0.5  | 7.2  | 0.5  |
| ZB 2-1    | 2.0      | 6.6  | 0.4  | 7.1  | 0.9  |
| ZB 3-1    | 3.0      | 6.3  | 1.0  | 7.3  | 1.3  |
| Pine Control | 0     | 31.1 | 8.5  | 25.9 | 1.2  |

The foregoing detailed description is given for clearness of understanding only, and no unnecessary limitations should be understood therefrom, as modifications within the scope of the invention will be apparent to those skilled in the art.

We claim:

1. A method of producing a cellulosic composite article, comprising the steps of:
   (a) combining zinc borate with cellulosic material to form treated cellulosic material comprising hardwood fibers;
   (b) forming a mat comprising said treated cellulosic material and a binder resin; and
   (c) pressing said mat under heat to form a cellulosic composite; and
   (d) providing steam to said mat during said step (c).

2. The method of claim 1, further comprising:
   combining said binder resin and said cellulosic material prior to step (a).

3. The method of claim 1, wherein the cellulosic material consists essentially of hardwood fibers.

4. The method of claim 1, wherein the zinc borate is combined at a rate of about 0.1% to about 3.0% based on the dry weight of the cellulosic material.

5. The method of claim 1, wherein the zinc borate is combined at a rate of about 0.5% based on the dry weight of the cellulosic material.

6. The method of claim 1, further comprising:
   providing a wax to said mat prior to step (c).

7. The method of claim 6, wherein the wax is provided at a rate of about 1% to about 3% based on the dry weight of the cellulosic material.

8. The method of claim 6, further comprising:
   providing a catalyst to said binder resin prior to step (c).

9. The method of claim 1, wherein:
   said mat has a moisture content of about 12 wt. % or less.

10. The method of claim 1, wherein:
    step (c) comprises providing the cellulosic composite article with an embossed surface resembling natural wood.

11. The method of claim 1, wherein:
    step (d) comprises injecting saturated steam into the mat to transfer heat and moisture into the mat.

12. The method of claim 11, wherein:
    the mat is subjected to a pressure in a range of about 200 psig to about 300 psig.

13. The method of claim 11, wherein:
    the saturated steam is at a temperature in a range of about 150° C. to about 200° C.

14. The method of claim 9, wherein:
    step (c) is performed over a time of less than about one minute.

15. A cellulosic composite made by the method of claim 1, wherein said composite article is molded in a form selected from the group consisting of exterior siding, exterior trim pieces, shutters, soffits, door pediments, columns, and roofing.

16. A method of making a consolidated cellulosic article, comprising the steps of:
    (a) combining zinc borate with hardwood cellulosic material to form treated cellulosic material;
    (b) combining a binder resin with said treated hardwood cellulosic material; and
    (c) applying heat and pressure to said binder resin and treated cellulosic material to form a consolidated article.

17. The method of claim 16, wherein the zinc borate comprises particles smaller than 400 mesh.

18. The method of claim 16, wherein the zinc borate is combined at a rate of about 0.1% to about 3.0% based on the dry weight of the cellulosic material.

19. The method of claim 16, wherein the zinc borate is combined at a rate of about 0.5% based on the dry weight of the cellulosic material.

20. The method of claim 16, further comprising:
    combining a wax with said binder resin or said treated cellulosic material.

21. The method of claim 16, wherein the wax is combined at a rate of about 1% to about 3% based on the dry weight of the cellulosic material.

22. The method of claim 16, wherein the steps are performed sequentially.

23. A method of producing a cellulosic composite article, comprising the steps of:
    (a) combining zinc borate with cellulosic material to form treated cellulosic material, said zinc borate comprising particles smaller than 400 mesh;
    (b) forming a mat comprising said treated cellulosic material and a binder resin; and
    (c) pressing said mat under heat to form a cellulosic composite; and
    (d) providing steam to said mat during said step (c).

24. A cellulosic composite article made by the method of any of claims 1, 4, 5, 11, 14 or 23.

* * * * *